United States Patent Office 2,973,226
Patented Feb. 28, 1961

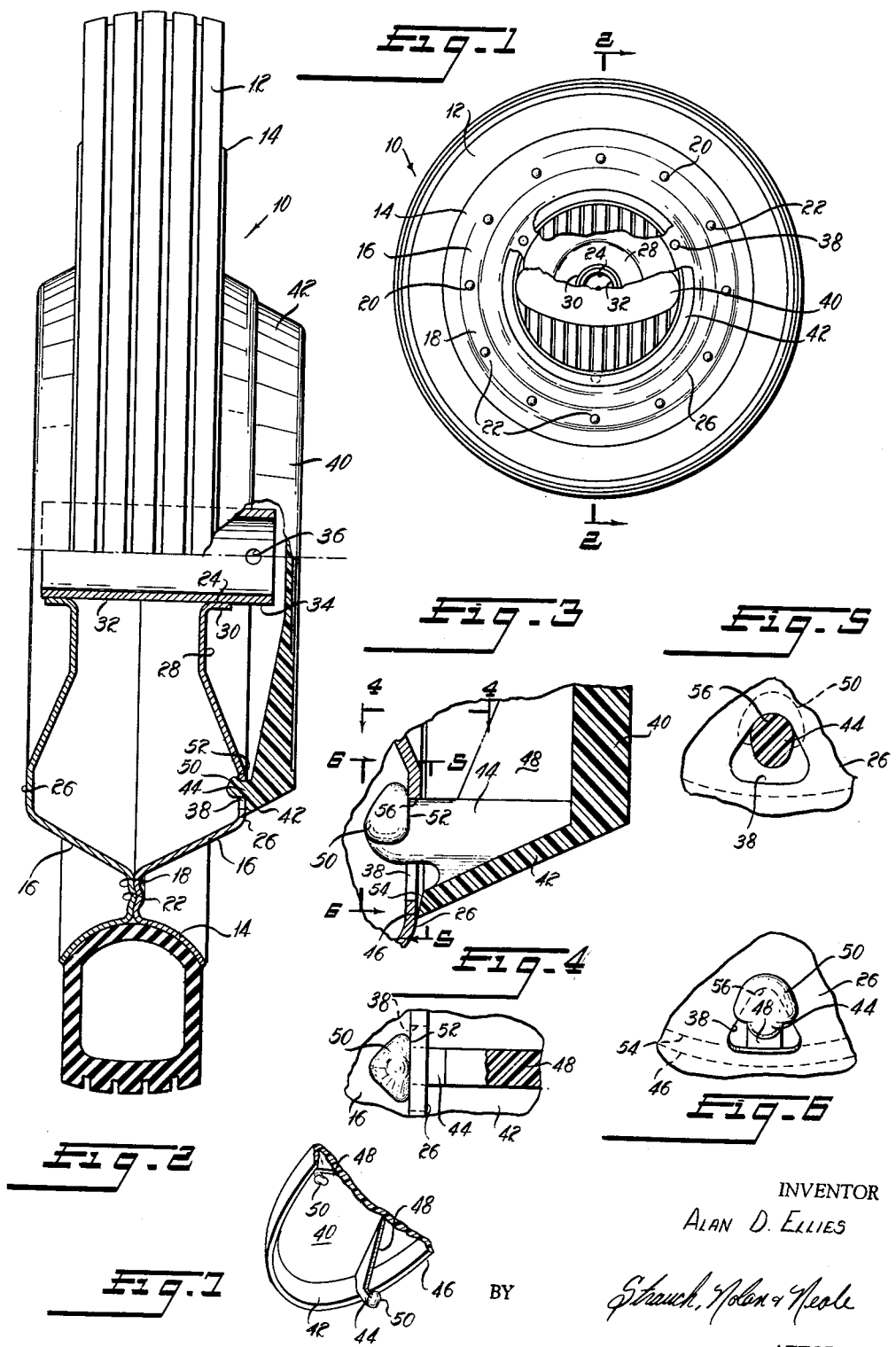

2,973,226

WHEEL AND HUB CAP

Alan D. Ellies, Columbus, Ohio, assignor to The O. M. Scott & Sons Company, Marysville, Ohio, a corporation of Ohio Filed Oct. 11, 1956, Ser. No. 615,277

3 Claims. (Cl. 301—37)

This invention relates to an improved wheel and hub cap combination and more particularly to the novel cooperative structure of a plastic hub cap which can be easily and readily removably secured to associated side structure of a wheel member.

The original purpose of this invention was to provide an economical wheel and hub cap combination for use on lawn spreaders which normally consists of a hopper supported by two wheels and an axle passing through the bottom of the hopper. The axle also normally carries an agitator disposed inside the hopper and as the spreader is moved over the ground the axle shaft is rotated, preferably by only one wheel, to rotate the agitator. One wheel is keyed to the shaft, usually by a cotter key passing through one end of the wheel journal sleeve, and the other wheel is freely journalled on the shaft and maintained by suitable means such as a washer and cotter key. With such a wheel installation, a portion of the wheel journal sleeve or the end of the axle shaft normally projects past the side plane of the wheel. Previously used wheeled hopper devices often had right and left wheels and a small metallic hub cap was fastened over the wheel journal or axle projections. These metal caps were provided with conventional securing clips or lugs which keyed in matched holes in wheel structure, or were bent over a portion of the wheel, or were fastened to the axle by cotter pins. One primary disadvantage of the small metal caps, particularly as used on lawn spreaders, was a resultant skinning of trees, shrubs, house paint and other objects whenever the spreader wheel brushed against the object. This could be alleviated to some extent by using a larger hub cap with a more gradually faired external contour but some skinning of trees, shrubs, etc., would still occur because of the hard metal caps, and furthermore the high unit cost of a large metal hub cap, which usually require special securing clips, would not be feasible in lawn spreaders where total production cost is an important factor in mass market appeal.

In the present invention a wheel is provided with two discs, identical in structural details, fastened together and having a journal sleeve projected coaxially through their centers. One end of the journal sleeve extends beyond one disc and its other end terminates just slightly beyond the exterior of the other disc. The extended end of the journal sleeve is used to key the wheel to an axle shaft, if desired, or the wheel can be freely journalled on an axle shaft and retained by a washer and a cotter pin. In either instance an annular portion of one of the discs will face outwardly. This portion provides an annular platform with several small apertures or pin retaining holes which cooperate with securing pins constituting projections structurally integral with a semirigid plastic hub cap. The hub caps are formed with sufficient depth to afford space for the extended journal sleeve or for the end of the axle which may project beyond a freely journalled wheel. By using a plastic that will provide a firm shape yet have an inherent resilience, such a nylon or polyethylene or molded rubber and the like, a plurality of pin projections with special gripping heads, molded as an integral part of the hub cap, are pressed into the wheel disc apertures and maintain the cap snugly and securely over the wheel hub. The integral hub cap provides a resilient buffer which, in cooperation with the wheel tire, will prevent any metal portion of the wheel from skinning trees, shrubs and other objects.

It is to be understood that this invention is not restricted to wheels for lawn spreaders but is applicable to other wheeled devices, such as lawn mowers and carts.

Flexible hub caps have been previously proposed, as disclosed in Patent No. 2,015,352, to J. S. Reid, which shows a hub cap of molded rubber or the like with special gripping formations attached to or integral with the side of a tubular sleeve of the hub cap. However, the functional cooperation of such previously known hub cap with the wheel to enable its retention is materialy distinct from the present invention, as will be clearly seen as this description progresses.

Accordingly, a primary object resides in providing a novel one piece hub cap which has integral resilient pins used to removably secure the hub cap to a wheel.

Still another object resides in providing a plastic hub cap that includes integral plastic pins enabling the hub cap to be readily secured to a wheel and firmly maintained in position by the inherent resilience of the plastic material of the hub cap and pins.

Another object resides in the provision of a wheel including an annular side platform with circumferentially spaced apertures and a plastic hub cap with integral plastic pins circumferentially spaced on its inner side which project into associated apertures on one or the other side of the wheel and firmly hold the hub cap with its inside edge against the associated annular side platform of the wheel.

Further novel features and objects of this invention will become apparent from the following detailed description and the appended claims taken in conjunction with the accompanying drawings showing a preferred embodiment thereof, in which;

Figure 1 is a side elevation of a wheel and hub cap combination embodying this invention, with the hub cap partially broken away;

Figure 2 is a front view of the wheel and hub cap partially sectioned essentially on line 2—2 of Figure 1;

Figure 3 is an enlarged detail view illustrating the cooperative engagement between a pin projection of the hub cap and an associated aperture in the wheel disc and the abutment between the annular edge of the hub cap and the annular side platform of a wheel disc;

Figures 4, 5 and 6 are detail section views of a hub cap pin taken on respective lines 4—4, 5—5 and 6—6 of Figure 3; and Figure 7 is a partially broken away perspective view of the inner side of a hub cap showing the integral formation of the securing pins.

With reference now to the drawing, which illustrates a specific embodiment of a double disc wheel with a special hub cap removably secured to the wheel disc, the complete wheel 10 has a hollow annular rubber tire 12 carried in the curved rim 14 formed by the abutted peripheries of two identical wheel discs 16.

Each wheel disc 16 has an annular portion 18 immediately adjacent the rim 14 disposed in a radial plane and the portions 18 of both discs 16 are abutted and fastened together by a plurality of spot welds 20 (Figure 1). Circumferentially spaced around the annular portion 18 are a plurality of dimples 22, alternate ones of which are formed from opposite sides of the disc to thereby provide a circumferential row of alternate projections and depressions. These dimples 22 are used to accurately locate two abutted discs 16 prior to their being fastened together by the spot welds 20. Each disc 16 has an annular dished shape intermediate its rim 14 and a central aperture 24 forming an annular side platform 26 between the inner and outer peripheries of the disc and projecting beyond the plane of the edge of the rim 14. The disc wall, radially within the side platform 26, is tapered to an inner section 28 terminating in an outwardly disposed annular flange 30 surrounding the disc aperture 24. When two discs 16 are assembled and welded the annular flanges 30 are inset slightly below the planes of the associated annular side platforms 26.

A journal sleeve 32 extends through the aligned apertures 24 of the joined discs 16 and is rigidly secured to flanges 30 as by several spot welds and serves as the wheel hub. One end 34 of sleeve 32 projects beyond the plane of the adjacent side platform 26 a sufficient distance to permit the location of diametral holes 36 in the sleeve end 34 slightly offset beyond the plane of the side platform. This permits the wheel to be easily and conveniently drive connected to an axle shaft (not shown) by a cotter pin (not shown).

In the illustrated embodiment, the sleeve 32 is made of rolled sheet metal and the discs 16 are stamped from sheet metal stock with all details, including the hub cap apertures, to be described, being formed in a single stamping operation if so desired. It is contemplated that the wheel discs and journal sleeve can be formed from suitable plastic material and bonded together as an assembled wheel.

The above described wheel disc structure has a journal sleeve 32 of sufficient length to maintain wheel alignment under rugged operating conditions and the disc shape also provides a relatively large diameter hub cap platform 26, which is substantially coextensive with one or the other ends of the journal sleeve. At least three holes 38 are punched or otherwise formed in the annular platforms 26 at circumferentially equally spaced intervals. Holes 38 may be round as in Figure 1 or essentially triangular as in Figures 5 and 6.

Of particular importance in this invention is the unitary hub cap construction of molded semi-rigid non-metallic material, which is preferably one of the plastics such as polyethylene or nylon, having an inherent resilience. Various details of hub cap or wheel cover 40 are shown in the several figures, and the disclosed embodiment utilizes a shallow dished cap with a frusto-conical rim 42. However, the external design configuration can be made in many embodiments as will be appreciated. Furthermore, the unitary hub-cap can be used on single disc wheels, metal or plastic, or on other wheels that have structure providing the annular platform as will be described.

At least three pins 44 are provided in the form of projections molded as a structurally integral part of hub cap 40 and project from the cupped side of the cap at circumferentially equally spaced positions, inset a slight distance from the edge 46 of hub cap rim 42. A radial gusset 48, provided for each of the pins 44, is also an integrally molded part of the cap 40 and extends from rim 42, intersecting and including a base portion of a pin 44, and along the inside of the hub cap face toward the hub cap center. Gussets 48 provide added rigidity to the rim 42, aiding in maintaining its annular shape and, with the closely adjacent portions of the rim, provide a rigidly disposed base portion for each pin 44.

A short extent of each pin 44 extends beyond the plane containing the rim edge 46 and the pins terminate in a flanged head 50. A shoulder 52, formed where the pin head 50 intersects the pin body, is disposed a fixed distance beyond the rim edge plane. This fixed distance is slightly less than the thickness of the wheel disc material which forms the disc platform 26.

The rim end surface 54, adjoining rim edge 46, is preferably beveled away from the rim edge plane toward the center body portion of the hub cap 40 providing an essentially annular knife edge shape to the rim edge 46, which enables a resilient deflection of rim edge 46, for a purpose to be presently described, when the hub cap is installed on the wheel. In lieu of the beveled end surface 54, the end surface can remain in the rim edge plane, in which case the rim edge will have a greater rigidity and more effort will be required to install the hub cap.

In Figures 5 and 6, the pin retaining holes 38 in the annular wheel platform 26 are triangular in shape with all corners rounded and with one corner 56 disposed toward the wheel axis. This inner corner is preferably rounded to conform with the contour of a hub cap pin 44 and is disposed a radial distance from the wheel axis substantially equal to the radial distance from the hub cap axis to the inner edge of a pin 44. Thus, in an assembled wheel 10 and hub cap 40 the inner sides of the projected bodies of all pins 44 will fit snug against the inside corners 56 of associated pin holes 38 (Figures 1, 3 and 5). The pin heads 50 are formed with a partial flange extended around approximately one-half of the pin end and disposed toward the center of the hub cap, resulting in a generally triangular plan profile. This configuration enables the projected pin 44 and head 50 to fit through the triangular pin hole 38, and when the pin body fits into the inner corner 56 of hole 38, a major portion of the shoulder 52 under flanged head 50 will overlie the inner side of platform 26 surrounding hole 38.

Shown in Figures 3 and 4, the heads 50 of pins 44 are wedge shaped to aid in causing a radially outward deflection of pins 44 during insertion of the pins 44 in the pin holes 38 when the hub cap 40 is installed.

When the hub cap 40 is being installed it will be positioned with pin heads 50 resting in associated pin holes 38. A sharp blow on the hub cap 44 with the heel of a person's hand will force the pin heads 50 into holes 38. The wedge shape of heads 50 acting against the inner corners 56 of holes 38 will cause the pins 44 to deflect radially outward and when the pin heads pass through their associated holes 38 the inherent resilience of the pins 44 and cap 40 will cause the pins to move radially inward toward their normal position which places the shoulders 52 of pin heads 50 in a retaining position behind the edges of the holes. When the pins 44 are thus forced into holes 38, the edge 46 of hub cap rim 42 is deflected slightly because of the aforementioned difference between the distance from the edge plane of rim 42 to the pin head shoulders 52 and the thickness dimension of the wheel disc material. This edge deflection creates a biasing force between the hub cap rim 42 and the annular platform 26, maintaining the pin head shoulders 52 tightly pressed against the inner side of the platform 26 and also maintains a tight dust and dirt seal between the hub cap 40 and the outer side of platform 26. Note, in Figures 5 and 6, the rim edge 46 contacts the platform radially outward of the outer edges of pin holes 38.

Hub cap 40 can be readily removed by gripping the rim 42 between two of the pins 44 and exerting a pull force outwardly to cause the pins 44 to deflect and pull the flanged heads 50 out of the holes 38. For wheeled devices larger than garden material spreaders, which would have heavier wall construction for the hub caps, an appropriate tool, like a screwdriver, can be inserted under the rim and the cap can be readily pried off.

Circular pin holes 38 have been used in the present invention, in which instance the flanged pin heads 50 were formed circular with a conically wedged shape for insertion. Of course, the pins 44 and holes 38 could be related so the pins would deflect inwardly upon insertion; the pins in such an arrangement pressing against the outer edge of holes 38 with the head 50 gripping the outer edge.

The foregoing description, discloses a new wheel and hub cap combination which embodies economical, rugged construction for both wheel and hub cap. The wheel construction provides a large diameter hub cap platform which together with the retained hub cap provides an attractive highly decorative appearance and enables a large hub cap area to be used with a readily discernible insignia. This invention includes a one piece hub cap, with integral retaining pins, molded or otherwise formed of inexpensive non-metallic material. The hub caps are easily installed and removed, provide an excellent dust seal, and being of a resilient material, such as semi-rigid plastic, constitute an effective buffer when wheels of a device such as a lawn material spreader come in contact with shrubs, trees or other objects.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wheel combination comprising: an annular side platform of sheet material having a predetermined thickness surrounding the wheel hub and having a plurality of circumferentially spaced apertures formed in the platform; a wheel hub cover member comprising a resilient, semi-rigid, non-metallic cup-shaped member having a rim edge disposed in a plane substantially normal to the axis of the wheel with a plurality of circumferentially spaced structurally integral, radially deflectable resilient projections, provided with retaining heads, extending from the concave portion of said cup-shaped member; said retaining heads providing shoulder portions adjacent the body of said projections which, before assembly of the cover member on the side platform are spaced beyond the plane of the cover member rim edge a distance approximately equal to but less than the dimension of the predetermined thickness of said sheet material; said retaining heads being of a size enabling substantially free passage through associated apertures; said shoulder and said apertures and projections being radially disposed, from the centers of the wheel and the hub cover member respectively, at distances which locate each projection at a radial distance from the wheel center different from the radial distance at which its associated aperture is located, so that the shoulder portions of said projections are disposed under the edges of associated apertures and biased in such disposition by inherent resistance of said projections to radial deflection.

2. A wheel combination as defined in claim 1, wherein said hub cover member is made of a plastic material and said rim edge is beveled outwardly so it will resiliently engage the platform with an essentially annular line contact.

3. A wheel combination as defined in claim 1, wherein said apertures are essentially triangular in shape with at least one corner being rounded and pointing along a radial line from the wheel, and said retaining head being wedge shaped and offset to one side of said projection the same direction as said rounded corner of said aperture relative to the center of the hub cover member.

References Cited in the file of this patent

UNITED STATES PATENTS

| | | |
|---|---|---|
| 418,149 | Anderson | Dec. 31, 1889 |
| 484,552 | Gleeson | Oct. 18, 1892 |
| 1,686,509 | Barber | Oct. 9, 1928 |
| 1,947,025 | Turner | Feb. 13, 1934 |
| 2,013,527 | Sherman | Sept. 3, 1935 |
| 2,070,993 | McDonald | Feb. 16, 1937 |
| 2,172,458 | Shuart | Sept. 12, 1939 |
| 2,479,538 | Liljenberg | Aug. 16, 1949 |
| 2,479,810 | Bradley et al. | Aug. 23, 1949 |
| 2,509,949 | Worthington | May 30, 1950 |
| 2,606,791 | Specht | Aug. 12, 1952 |
| 2,663,751 | Bashara | Dec. 22, 1953 |
| 2,665,947 | Lyon | Jan. 12, 1954 |
| 2,692,801 | Rosenberg | Oct. 26, 1954 |
| 2,741,396 | Lobl | Apr. 10, 1956 |
| 2,744,650 | Woessner | May 8, 1956 |

FOREIGN PATENTS

| | | |
|---|---|---|
| 456,866 | Great Britain | Nov. 17, 1936 |
| 371,160 | Italy | Mar. 12, 1939 |
| 1,128,655 | France | Aug. 27, 1956 |